(12) United States Patent
Coudray et al.

(10) Patent No.: US 6,310,635 B1
(45) Date of Patent: Oct. 30, 2001

(54) DEVICE FOR DETERMINING A QUANTITY OF CONSUMABLE PRODUCT PRESENT IN A RESERVOIR AND CORRESPONDING DEVICE FOR PRINTING DOCUMENTS

(75) Inventors: Pascal Coudray, La Chapelle des Fougeretz; Marie-Hélène Froger, Chateaugiron; Mickaël Lorgeoux, Rennes, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/083,132

(22) Filed: May 22, 1998

(30) Foreign Application Priority Data

May 26, 1997 (FR) .................................................. 97 06380

(51) Int. Cl.⁷ .................................................... B41J 2/195
(52) U.S. Cl. ........................................................... 347/7
(58) Field of Search .................... 347/7, 46, 14, 347/19, 23; 346/140 R; 141/45; 73/304 C; 307/353

(56) References Cited

U.S. PATENT DOCUMENTS 4,415,886  * 11/1983  Kyogoku et al. ......................... 347/7
4,810,904  *  3/1989  Crawford .............................. 307/353
4,812,785      3/1989  Pauker .................................. 331/117
4,853,718      8/1989  ElHatem et al. ................. 346/140 R
5,735,167  *  4/1998  Puukanhas et al. ............... 73/304 C

FOREIGN PATENT DOCUMENTS 256580  2/1988  (EP) .
438159  7/1991  (EP) .

OTHER PUBLICATIONS

D.W. Phillips, "Capacitive ink level detector", IBM Technical Disclosure Bulletin, vol. 16, No. 10, Mar. 1974, pp. 3293–3294.

* cited by examiner

Primary Examiner—John E. Barlow, Jr.
Assistant Examiner—Charles W. Stewart, Jr.

(57) ABSTRACT

Determination of the quantity of consumable product, notably of ink, remaining in a reservoir.

A capacitor (36) is formed on each side of the reservoir (24) and a resonant circuit including this capacitor is formed with a circuit forming a notional inductor (74), such as a gyrator, and another capacitor (68), the capacitor (36) being integrated into the circuit forming a notional inductor.

29 Claims, 5 Drawing Sheets

DEVICE FOR DETERMINING A QUANTITY OF CONSUMABLE PRODUCT PRESENT IN A RESERVOIR AND CORRESPONDING DEVICE FOR PRINTING DOCUMENTS

The invention relates to a device for determining a quantity of consumable product present in a reservoir and more especially a reservoir forming part of a movable appliance able to move along a predetermined path.

In this regard, the invention also concerns, as an application, a document printing device which has a movable appliance provided with such an ink reservoir, preferably removable and/or exchangeable and provided with such means for determining the quantity of ink remaining in the reservoir.

Several principles used notably in printing devices using ink jet technology are known for determining the level of ink remaining in a reservoir or at least detecting a minimum level, enabling the user to be alerted to the need to fill a reservoir or, more often, to change a cartridge comprising such a reservoir, generally associated with an ink jet printing head. Some of these principles use a capacitor of relatively low capacitance (a few picofarads) produced in such a way that the reservoir is located or is able to be located at a given moment between two plates of this capacitor, that is to say in the dielectric space thereof. In this way, the quantity of ink present in the reservoir has a direct influence on the overall permittivity of the said dielectric space. This correlation is used to determine the quantity of ink in the reservoir.

For example, the document EP 0 028 399 describes a method for detecting the minimum level of ink in a reservoir, using a resonant circuit whose capacitor is formed by two metal plates between which the ink reservoir is located. The latter therefore fills the dielectric space of the said capacitor and the quantity of ink has a direct influence on the permittivity of the said dielectric space, and therefore on the value of the capacitance.

The resonant circuit is calibrated so that its resonant frequency and the maximum voltage in its measurement resistor is reached when the level of ink reaches a predetermined low level. When the resonance is reached, a signal able to be used for the warning signal is transmitted. Consequently, with such a system, the only information available is an indication of whether or not the level of ink is higher than a predetermined lower threshold.

In the prior system indicated above, the capacitor is associated with an inductor coil and with an alternating signal generator to form the aforementioned resonant circuit. The value of the resonant frequency is therefore $$F_0 = \frac{1}{2\pi\sqrt{LC}},$$

where L is the value of the inductance and C the value of the capacitance of the capacitor associated with the reservoir.

However, the value of this capacitance is, as has been seen, around a few picofarads. It would be advantageous for the resonant frequency of this resonant circuit to be situated and to move within a range of frequencies around 1 kHz or a few tens of kHz. However, with a capacitor which has such a low capacitance, the inductance would need to be equal to several tens of henries. This is impracticable, if not technologically then at least in terms of cost. This is why, in a prior device as described above, the resonant frequency is situated and moves within a range of frequencies larger than 1 MHz. Furthermore, the adjustment of this resonant frequency is directly linked to the precision of the inductance. This makes it more difficult to produce, and therefore increases the cost of the device. If it is attempted to reduce the value of the inductance, it becomes necessary to further increase the resonant frequency up to several tens of MHz, and problems of electromagnetic radiation are then encountered.

The invention aims notably to resolve the problems described above by making it possible to define a resonant circuit which incorporates the low-value capacitor associated with the reservoir as indicated but nonetheless having a resonant frequency situated and moving in average frequencies. In this case, average frequency is understood as a frequency between approximately one or few kHz, or indeed several tens of kHz. A resonant circuit of this type is optimum for the application envisaged in that it avoids the need to use expensive or bulky components and/or those requiring fine adjustment. The problems of electromagnetic radiation described above are also avoided.

The invention preferably aims to indicate a measurement of the quantity of consumable product remaining in the reservoir and not simply to indicate that a predetermined value, representing a low level, has been reached.

The invention particularly relates to a device for measuring a level of ink in a printing device comprising an exchangeable cartridge comprising an ink reservoir, the arrangement requiring no or practically no modification of the cartridge.

The basic idea of the invention consists of using the low-value capacitor associated with the reservoir as a component of an electronic circuit forming a notional inductor, that is to say having an impedance comparable to that of an inductor coil, increasing with the frequency, and combining with this circuit forming a notional inductor another capacitor to form the resonant circuit.

More specifically, the invention therefore concerns a device for determining a quantity of consumable product present in a reservoir, of the type comprising:

a capacitor comprising two conductive elements forming the plates thereof, disposed in such a way that the said reservoir is situated at least partly in the dielectric space defined by the said two plates, a resonant circuit comprising the said capacitor and connected to an excitation signal generator, detection means connected so as to receive a signal coming from this resonant circuit and representing the said quantity of consumable product, characterised in that the said capacitor is incorporated into a circuit forming a notional inductor and in that this circuit is associated with another capacitor to form the said resonant circuit.

A notable advantage of the invention lies in the fact that the resonant circuit thus produced is entirely devoid of a winding producing the inductor coil, component which is generally expensive and bulky.

A circuit constituting such a notional inductor is known per se.

In the context of the preferred application to a document printing device, the reservoir is an ink reservoir and is associated with a printing head situated in the immediate vicinity thereof. Such a printing head has a circuit made of silicon or another conductive element which can form one of the plates of the said capacitor. This conductive element can be at least part of the ink ejection control circuit of the said printing head.

In this case, advantageously, a selector controlled by the central unit of the printing device is provided to switch to the said printing head either the ink ejection control circuit or the resonant circuit with gyrator, at the moment when the quantity of ink remaining in the reservoir is to be measured.

Furthermore, one of the plates of the said capacitor is applied to a face of the said reservoir. The latter is made of insulating material and the plate can be produced by a metal plate abutting on a face of the reservoir and applied thereto or even by a metallisation carried by this face of the reservoir.

As a variant, the two plates of the capacitor can be plates applied to two faces of the reservoir, in which case the printing head does not form part of a plate of the said capacitor but simply forms an element occupying its dielectric space.

Of course, the invention also concerns any office machine having a device as defined above, notably for determining the quantity of ink remaining in a reservoir of a printing device. Such an office machine can consist essentially of a printer or a facsimile machine.

The invention also concerns any microcomputer having at least one device for determining ink levels as defined above.

The invention also relates, as a component enabling it to be implemented, to any ink refill cartridge for a device for printing documents characterised in that it has a reservoir and in that a conductive surface carried by a face of this reservoir is able to form a plate of a capacitor.

The invention will be better understood and other advantages thereof will be seen more clearly in the light of the description which follows, given solely by way of example and made with reference to the accompanying drawings in which.

Figure 1:
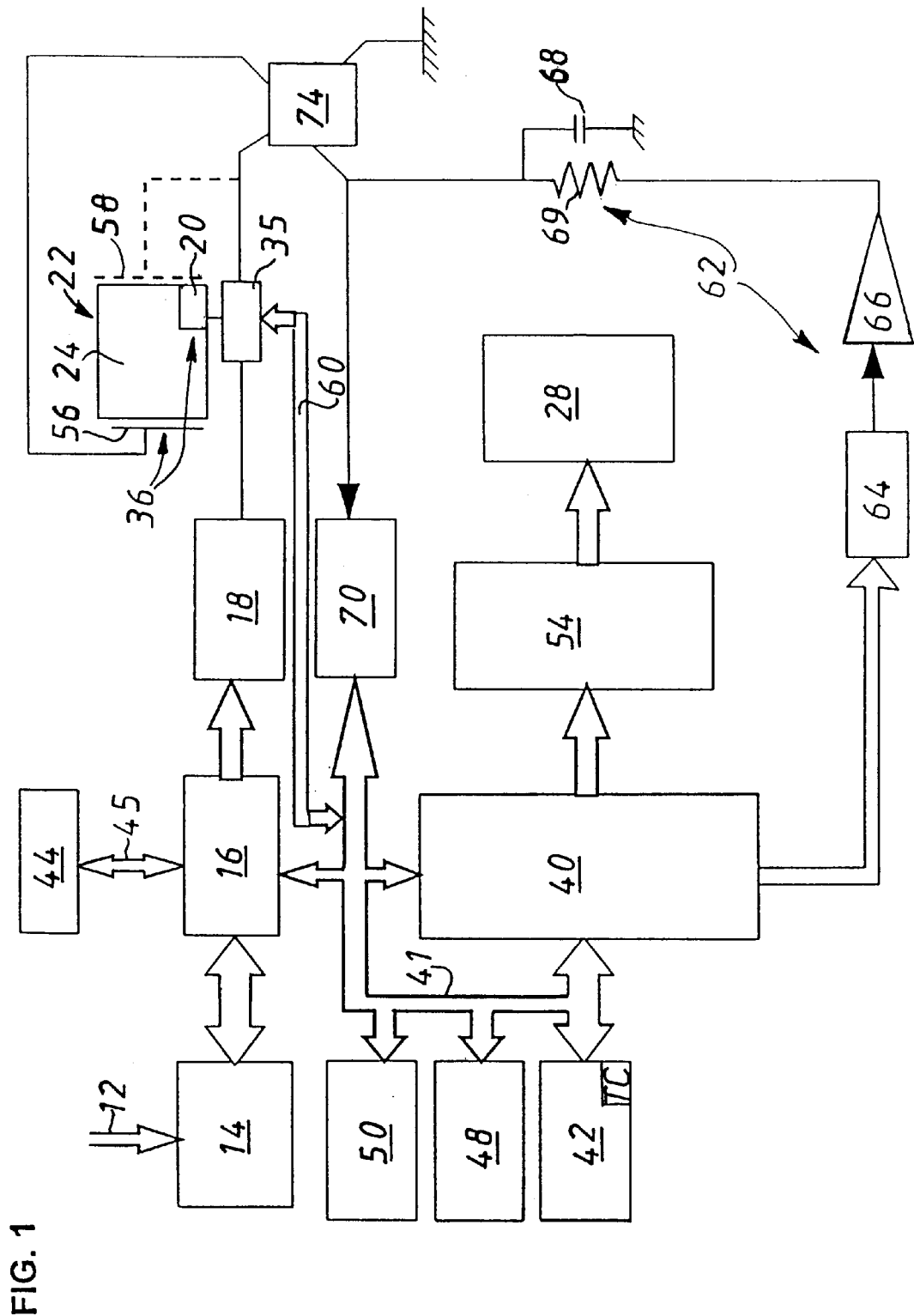
FIG. 1 is a block diagram of a printing device incorporating the means of the invention pour determining the level of ink present in an ink reservoir.
Figure 3:
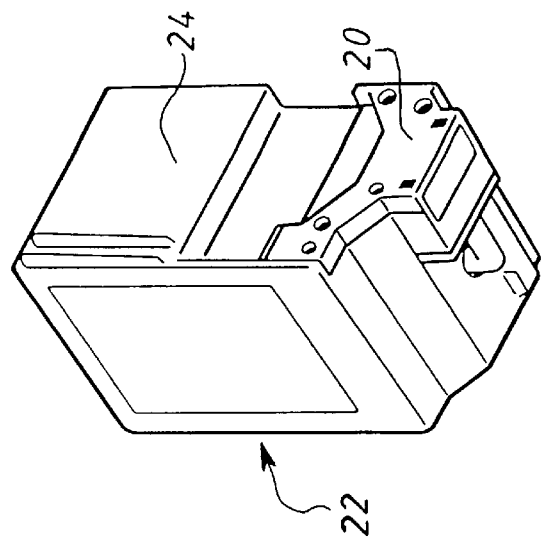
FIG. 3 is a diagrammatic detail view of the reservoir and of the printing head, forming an exchangeable cartridge.

Referring more especially to FIGS. 1 to 4, a printer 10 has been depicted which has a parallel input/output port 12 which receives the data to be printed and which is connected to an interface circuit 14; the latter is connected to an ink ejection control circuit 16 which controls, through an amplification circuit 18, an ink jet printing head 20 situated in a removable cartridge 22. Conventionally, this cartridge 22 has an ink reservoir 24 associated with the printing head 20. In the example depicted, the cartridge 22 is exchangeable, that is to say the assembly formed by the reservoir 24 and the printing head 20 is replaced each time the reservoir is empty.

Figure 2:
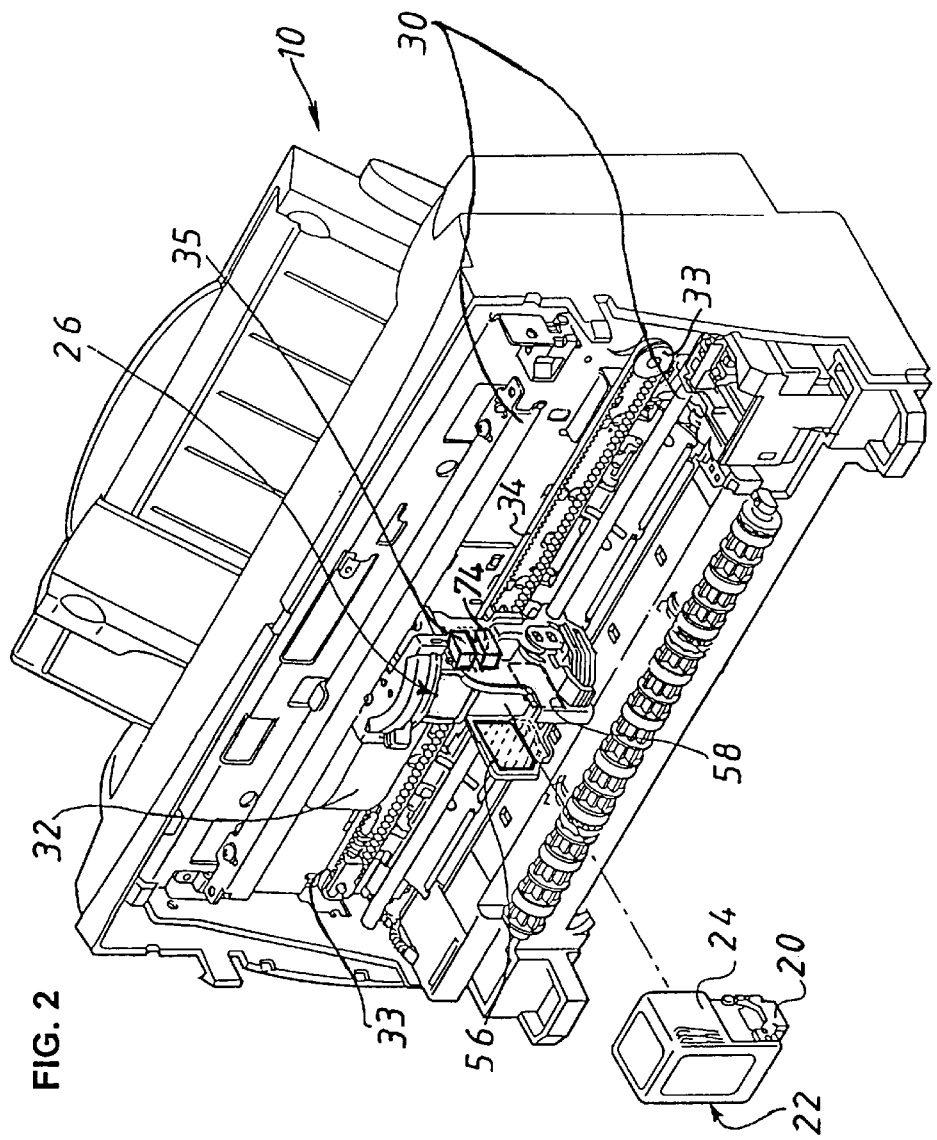
FIG. 2 is a simplified perspective view of this printing device.

The exchangeable ink cartridge is mounted on a translational carriage 26 actuated by a stepping motor 28, moving to and for along a movement path formed by guide rails 30. The motor drives the carriage by means of a system of pulleys 33 and toothed belt 34. The motor 28, which is not visible in FIG. 2, is coupled with one of the pulleys 33. The path along which the cartridge, that is to say the printing head, moves is parallel to a line to be printed on a printing medium, not depicted, such as a sheet of paper for example. The sheet of paper, for its part, is moved perpendicularly to this path. A flexible cable 32 with several conductors notably connects the amplification circuit 18 to a selector 35 carried by the carriage. As will be seen later on, this selector makes it possible to apply to the printing head 20 signals coming either from the ink ejection control circuit 16, during normal operation, or from the device according to the invention, during the progress of a succession of operations for determining the quantity of ink remaining in the reservoir. The printing head 20 comprises a silicon circuit and an insulant separating it from the ink. The selector 35 enables the silicon circuit to be used as the plate of a capacitor 36 forming part of the device of the invention, which will be described later on. The selector 35 is carried by the carriage so as to be situated as close as possible to the capacitor 36

The printer 10 also has a main processing circuit 40 connected by a Bus connection 41 to the control circuit 16, to a read-only memory 42 and to a random access memory 44. The read-only memory 42 contains the operating programs of the main processing circuit while the random access memory 44, also associated with the ink ejection control circuit 16 by means of a connection 45, temporarily stores the data received through the interface 14 and the data processed by the main processing circuit 40.

The main processing circuit 40 is connected to a display 48 to control the display of messages representing the operation of the printer. It is, furthermore, connected to a keypad 50 having at least one switch and by means of which the user can transmit operating commands to the printer. The main processing circuit is also connected to the motor 28 through an amplification circuit 54.

The printer which has just been described briefly is conventional and well known to persons skilled in the art. It will not, therefore, be described in further detail.

The device for determining the quantity of consumable product (that is to say the ink) present in the reservoir comprises the aforementioned capacitor 36, defined by two conductive elements forming the plates thereof and disposed in such a way that the reservoir 24 is situated in the dielectric space defined by these two plates. In the example, a first metal plate 56 is fixed on the outside of the reservoir on the carriage 26; it abuts on a face of the reservoir and is applied thereto when the cartridge 22 is in place on the carriage. As a variant, metallisation of an external face of the reservoir 24 could be provided so that such a plate would be changed at the same time as the cartridge.

In the example described, the other plate of the capacitor is formed by the silicon circuit which forms part of the printing head 20; this other plate is not, therefore, visible in the drawings. As a further variant, this other plate could consist of a second metal plate 58 fixed to the outside of the reservoir on the carriage in such a way as to be applied to another face of the said reservoir. In FIGS. 1 and 2, this variant is illustrated using broken lines. The plate 58 is in this case disposed parallel to the first plate 56 and spaced apart therefrom in such a way that the reservoir 24 can be inserted between them when the cartridge is mounted on the said carriage.

In this case, the device for determining the quantity of ink becomes independent of the printing control circuit 16 proper and the selector 35 can be omitted. However, it can be desirable to retain the switch, even in this configuration, to galvanically isolate the printing head while the device for determining the quantity of ink is operating.

The selector 35 is, in all cases, controlled by the main processing circuit 40, via a control connection 60.

In accordance with what has just been described, the reservoir 24 is situated practically entirely in the dielectric space of the capacitor 36 so that the quantity of ink in the reservoir has a direct influence on the permittivity of this dielectric space and consequently on the value of the capacitance of the said capacitor 36. However, the principle of the invention can be implemented even if the reservoir occupies only part of the dielectric space or conversely extends beyond it, so long as the variation in the quantity of ink can be translated into an appreciable variation in the value of the capacitance. Furthermore, in the example depicted, the capacitor is formed by two plates situated overall on each side of the reservoir 24, whatever the position of the carriage 26. It is, however, possible to implement the invention even if the capacitor is actually formed only for a predetermined position of the carriage, for example at one end of the travel of the latter if at least one of the plates is fixed and not carried by the carriage. In this case, the quantity of ink can be determined only when the carriage is situated in a given position.

The device also includes a resonant circuit 62 comprising the capacitor 36 as defined above and supplied with the excitation generator signal 64. The latter is, in this case, a variable-frequency oscillator, controlled by the main processing circuit 40 and whose output is connected to the input of an amplifier 66.

Figure 4:
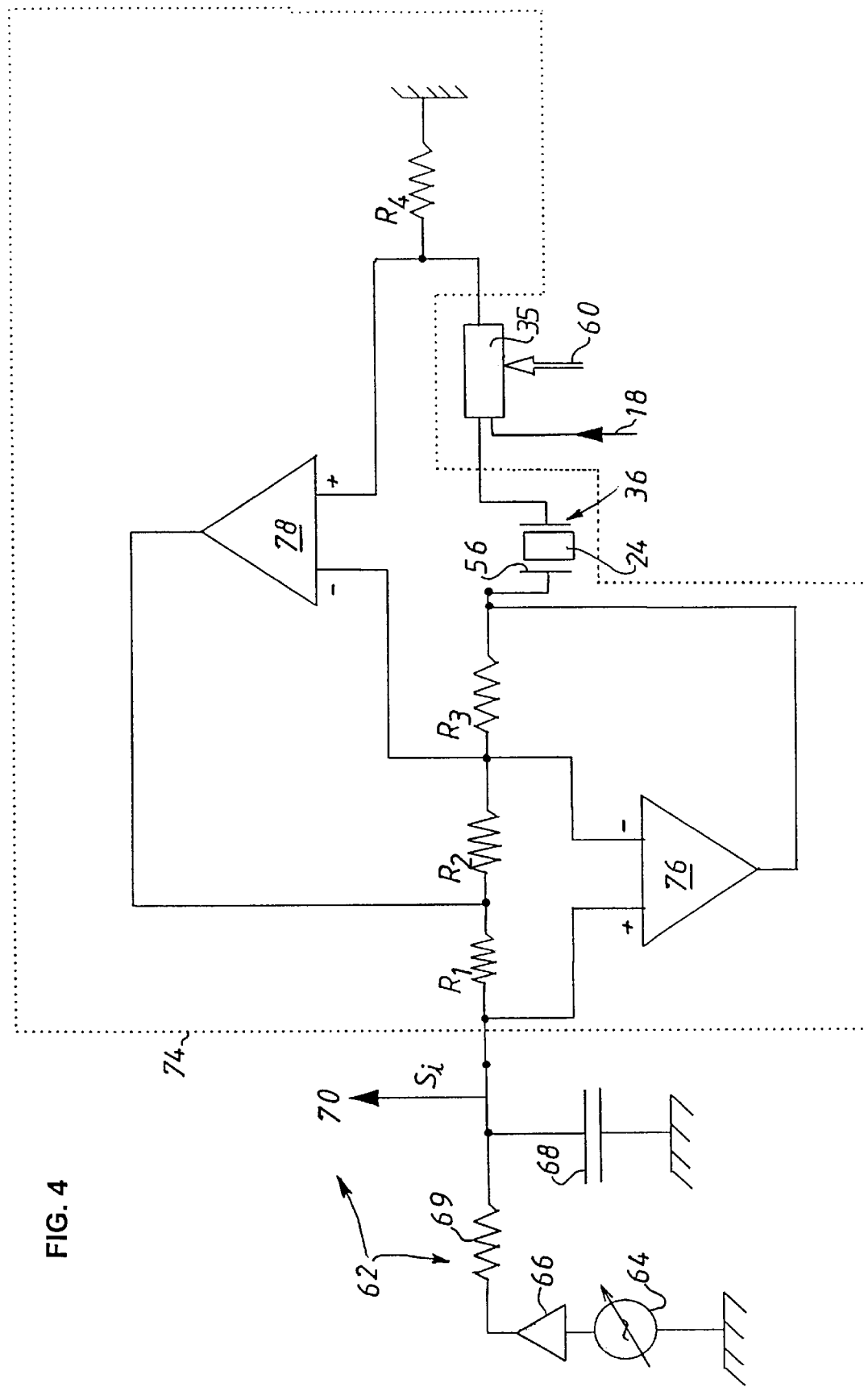
FIG. 4 is an electrical diagram of the resonant circuit incorporating a gyrator.

As depicted in FIGS. 1 and 4, the output of this amplifier 66 is connected to a terminal of another capacitor 68, via a damping resistor 69. The other terminal of this other capacitor is connected to earth. The common point of this resistor and this other capacitor is connected on the one hand to an analogue to digital conversion circuit 70 and on the other hand to an electronic circuit forming a notional inductor 74 incorporating the capacitor 36 associated with the reservoir 24. In FIG. 4, this circuit forming a notional inductor is a so-called "gyrator" circuit known per se. It is carried by the carriage 26 and therefore connected to other components of the device, notably the oscillator, by conductors of the flexible cable 32. The fact that the selector 35 and/or the gyrator 74 are mounted on the carriage 26, that is to say as close as possible to the capacitor, reduces the sensitivity of the system to parasitics and other electromagnetic interference.

The gyrator has a first differential amplifier 76, one non-inverting input of which is connected to the common point of the resistor 69 and capacitor 68 and the inverting input of which is connected to the common point of two resistors $R_2$, $R_3$. The resistor $R_3$ is connected to the output of this same amplifier and to the plate 56 of the capacitor 36 associated with the reservoir. The resistor $R_2$ is connected to a resistor $R_1$ connected to the non-inverting input of this amplifier. The common point of the said resistors $R_1$ and $R_2$ is connected to the output of a second differential amplifier 78. The inverting input of this second amplifier is connected to the common point of the resistors $R_2$ and $R_3$ while its non-inverting input is connected to the selector 35 and to a resistor $R_4$ connected to earth. The other terminal of the switch is connected to another plate of the capacitor 36, in this instance the printing head 20. During the normal operation of the printer, the selector 35 disconnects the capacitor 36 from the gyrator 74 and the signals delivered by the circuit 16 are applied to the ink jet printing head 20 via the amplifier 18. During the period of determination of the quantity of ink present in the reservoir, the plate of the capacitor is insulated from the amplifier 18 and connected to the non-inverting input of the second differential amplifier 78, via the selector 35. It is preferable for these operations of determining the quantity of ink to occur between operations of normal functioning of the printer, for example between the printing of two pages, that is to say when the printing head is in a predetermined idle position. To this end, the main processing circuit 40 can be programmed to control the selector 35 if and only if the said carriage 26 carrying the reservoir 24 is in a predetermined position.

The gyrator which is described with reference to FIG. 4 is of the type invented by ANTONIOU and enables a capacitive impedance to be converted to an impedance of the inductive type. More specifically, if Z is the impedance of the capacitor 36 associated with the reservoir, the impedance of the gyrator 74 is of the form:

$$Z_8 = \frac{R_1 R_3 R_4}{R_2 Z}$$

Thus, in one example of a simple application in which $R_1=R_2=R_3=R_4=10$ k$\Omega$, $Z_g=j(10$ k$\Omega)^2 C\omega$ where C represents the value of the capacitance of the capacitor and $\omega$ is the frequency of the excitation signal. Everything happens as if the capacitor 36 were transformed into an inductor of relatively high value because the value of the capacitance is multiplied by a factor of $10^8$.

By way of example, if the value of the capacitance of the capacitor associated with the reservoir is around 9 picofarads, the notional inductance created by this circuit will be around 900 $\mu$H. This enables a resonant circuit 62 to be developed which has a resonant frequency situated and moving within a range of average frequencies, typically between 1 and a few kHz approximately and several tens of kHz. By associating such a notional inductance of 900 $\mu$H with a 22 nF capacitor, for example, a resonant frequency of 30 kHz is reached. In order to further reduce the frequency, it is possible to reduce the value of the capacitor 68.

The control unit 40 controls the variable frequency oscillator 64, for example so that its frequency moves between a low value below the resonant frequency of the resonant circuit and a high value above the same resonant frequency. Under these conditions, the analogue to digital converter 70 transmits to the control unit digital information representing the resonance curve of the resonant circuit.

When an extremum is recorded, the corresponding frequency of the oscillator (at the same moment) is considered to be the resonant frequency of the resonant circuit. Thus the main processing circuit 40 and the converter 70 form detection means connected so as to receive a signal from the resonant circuit 62 (taken at the common point of the resistor 69, capacitor 68 and resistor $R_1$) and representing the quantity of ink present in the reservoir 24 at the moment of measurement. As indicated, these detection means are adapted (by virtue of the fact that the main processing circuit 40 controls a variation in the frequency of the generator 64) to determine and store the resonant frequency of the resonant circuit 62. The main processing circuit 40 associated with the memories 42 and 44 also constitutes processing means suitable for establishing a correspondence between the value of the resonant frequency thus determined and the quantity of consumable product (ink) remaining in the reservoir. As indicated above, the detection means 40, 70 comprise or constitute a circuit for detecting an extremum of the signal coming from the said resonant circuit 62. The quantity of ink, once determined, can be displayed on the display 48.

Figure 5:
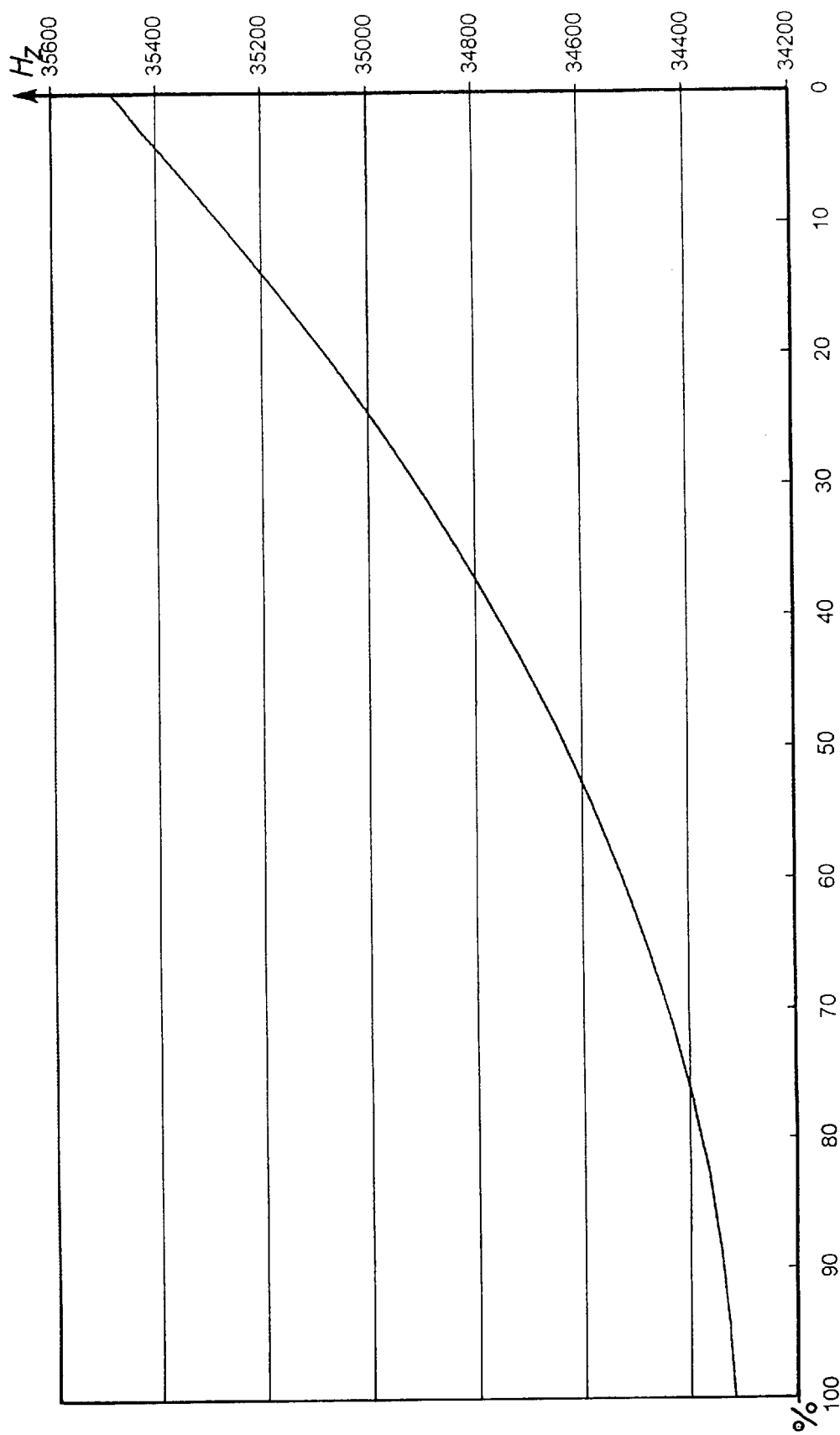
FIG. 5 is a graph showing an example of a relationship established between the quantity of ink remaining in the reservoir and the resonant frequency of the resonant circuit.
Figure 6:
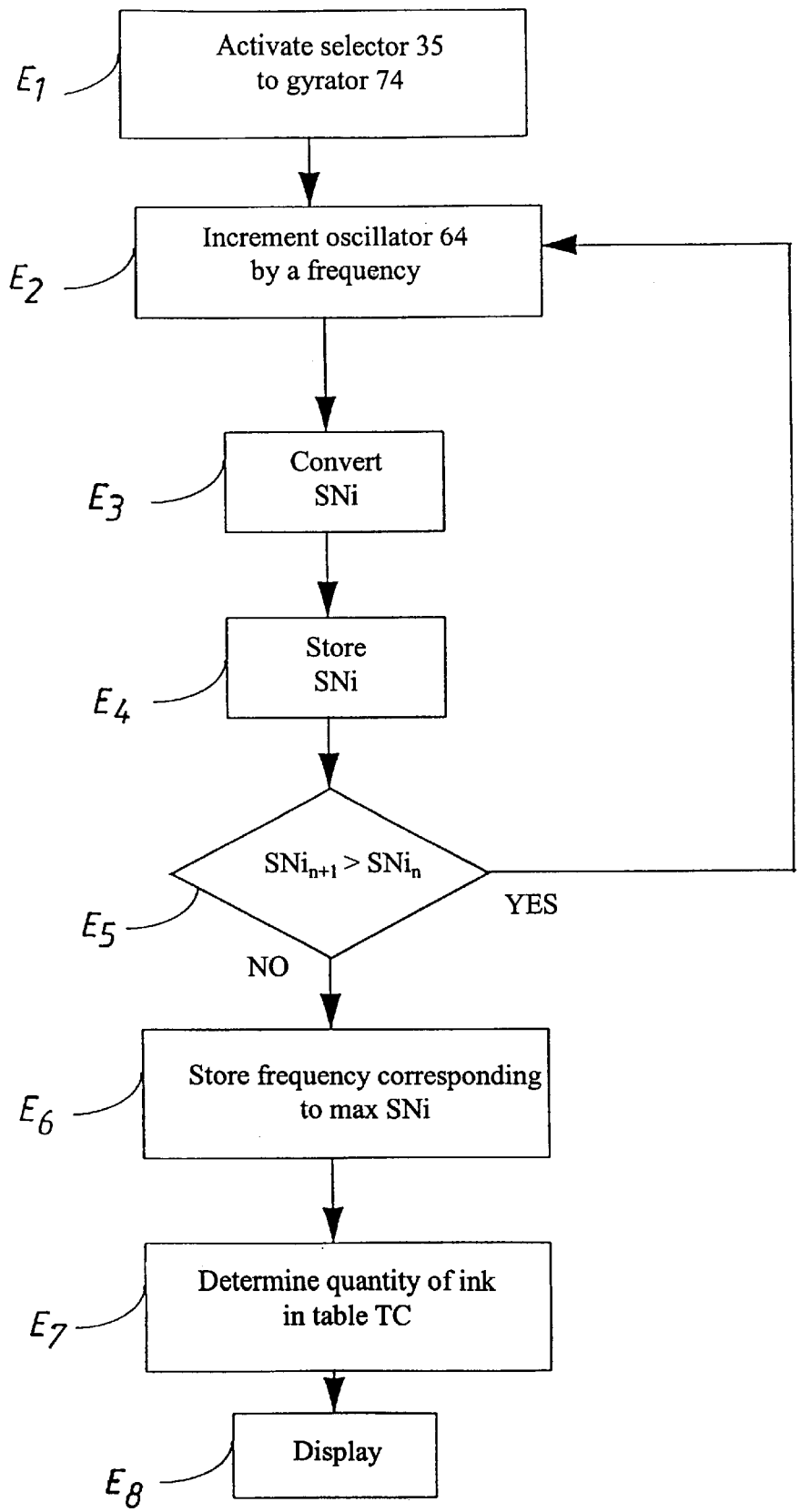
FIG. 6 is a flow diagram of a program recorded in a read-only memory of the circuit in FIG. 1, for the implementation of the invention.

FIG. 5 depicts an experimental curve showing the results obtained by the invention. The x-axis shows the quantity of ink remaining in the reservoir expressed as a percentage of the maximum quantity. The y-axis shows the resonant frequency, expressed in Hz, of the resonant circuit. It can be seen that this resonant frequency varies according to the quantity of ink remaining in the reservoir and that this variation, tabulated in the read-only memory 42, is significant and usable.

The algorithm for the implementation of the invention is entered in the read-only memory 42 of the printer. It essentially comprises eight steps and the corresponding operations are performed periodically, for example before a document is printed. The algorithm determines the quantity of ink in the reservoir 24. It is used under the control of the main processing circuit 40. Step $E_1$ consists of positioning the selector 35 so as to connect the printing head 20 to the gyrator 74. At this moment, the connection between the printing head and the amplification circuit 18 is severed and the plate of the capacitor 36 formed by the silicon element of the printing head is electrically connected to the resistor $R_4$ and to the input of the differential amplifier 78.

At step $E_2$, the processing unit 40 controls the incrementation of the frequency of the oscillator 64 so that the resonant circuit 62 receives an excitation signal of a given frequency.

At step $E_3$, the signal Si taken at the common point of the resistor 69, capacitor 68 and resistor $R_1$ and applied to the converter 70 is converted by it into digital information. This digital information Sni is stored in the random access memory 44 at step $E_4$. The main processing circuit 40 then checks, at step $E_5$, whether or not the value of Sni is higher than the preceding one. If the answer is yes, the system returns to step $E_2$ and the frequency of the oscillator 64 is incremented (by increasing it). If the answer is no, the processing unit 40 moves to step $E_6$, which consists of storing the value of the frequency of the oscillator 64 corresponding to the maximum Sni value.

The central unit then moves to step $E_7$ to determine the quantity of ink remaining in the reservoir and corresponding to the frequency which has just been stored, using a table TC entered in the read-only memory 42.

Sep $E_8$ consists of displaying the result.

As a variant, the value of the level of ink can be transmitted to a device situated at a distance, such as a microcomputer, using an interface.

What is claimed is:

1. A device for determining a quantity of consumable product present in a reservoir, the device comprising:
   a first capacitor having two conductive plates which are disposed so that the reservoir is located at least partly in a dielectric space defined by the two conductive plates;
   a resonant circuit including the first capacitor and connected to an excitation signal generator; and
   detection means connected so as to receive a signal from the resonant circuit, the signal representing the quantity of consumable product,
   wherein the resonant circuit comprises a notional inductor circuit which excludes a coil and includes the first capacitor and which is associated with a second capacitor.

2. A device according to claim 1, wherein the notional inductor circuit is a gyrator circuit.

3. A device according to claim 1 or 2, wherein the resonant circuit has a resonant frequency which is within a range of average frequencies between 1 and 50 kHz.

4. A device according to claim 3, wherein the detection means is adapted to determine a value of the resonant frequency of the resonant circuit and wherein the device also has processing means for processing the value of the resonant frequency to determine the quantity of consumable product.

5. A device according to claim 4, wherein the excitation signal generator is an alternating signal generator with a variable frequency which is within the range of average frequencies and wherein the detection means comprises a circuit for detection of a maximum and a minimum of the signal from the resonant circuit.

6. A device according to claim 1 or 2, wherein at least one of the two conductive plates of the first capacitor is applied to a face of the reservoir.

7. A device according to claim 6, wherein the reservoir is an ink reservoir, wherein the reservoir is associated with a printing head situated in the immediate vicinity thereof, and wherein the printing head has a conductive element which forms one of the two conductive plates of the first capacitor.

8. A device according to claim 7, wherein the conductive element is at least one part of an ink ejection control circuit of the printing head.

9. A device according to claim 6, wherein the two conductive plates of the first capacitor are respectively applied to two opposite faces of the reservoir.

10. A device according to claim 1, wherein the two conductive plates are respectively applied to exterior surfaces of opposite faces of the reservoir.

11. A device for printing documents, the device for use with a movable cartridge comprising an ink reservoir having a quantity of ink and a printing head, the movable cartridge for moving along a guide means arranged opposite a moving means for moving a printing medium, the device comprising:
    a first capacitor having two conductive plates which are disposed in such a way that the ink reservoir is situated at least partly in a dielectric space defined by the two conductive plates;
    a resonant circuit including the first capacitor and connected to an excitation signal generator; and
    detection means connected so as to receive a signal from the resonant circuit, the signal representing the quantity of ink,
    wherein the resonant circuit comprises a notional inductor circuit which excludes a coil and includes the first capacitor and which is associated with a second capacitor.

12. A device according to claim 11, wherein the notional inductor circuit is a gyrator circuit.

13. A device according to claim 11 or 12, wherein the resonant circuit has a resonant frequency which is within a range of average frequencies between 1 and 50 kHz.

14. A device according to claim 13, wherein the detection means is adapted to determine a value of the resonant frequency of the resonant circuit and wherein the device also has processing means for processing the value of the resonant frequency to determine the quantity of ink.

15. A device according to claim 14, wherein the processing means includes a main processing circuit and a read-only memory into which is entered information representing the quantity of ink corresponding to each one of plural values of the resonant frequency determined by the detection means.

16. A device according to claim 14, wherein at least one of the two conductive plates of the first capacitor is applied to a face of the reservoir.

17. A device according to claim 16, wherein the ink reservoir is associated with the printing head which is situated in the immediate vicinity thereof, and the printing head has a conductive element which forms one of the two conductive plates of the first capacitor.

18. A device according to claim 17, wherein the two conductive plates of the first capacitor are respectively applied to two opposite faces of the ink reservoir.

19. A device according to claim 13, wherein the detection means is adapted to determine a value of the resonant frequency of the resonant circuit and wherein the device also has processing means for processing the value of the resonant frequency to determine a quantity of consumable product.

20. A device according to claim 11, wherein the two conductive plates are respectively applied to exterior surfaces of opposite faces of the ink reservoir.

21. A device according to claim 11, further having a main processing circuit which is able to control a selector which operates so as to connect the first capacitor to the resonant circuit if the ink reservoir, carried by the movable cartridge, is in a predetermined position.

22. A device according to claim 20, wherein the selector is carried by the movable cartridge.

23. A device according to claim 11, wherein the ink reservoir and the notional inductor circuit are carried by the movable cartridge.

24. An ink refill cartridge for a document printing device, the ink refill cartridge comprising a reservoir and a conductive surface carried on a face of the reservoir which forms a plate of a capacitor.

25. A device according to any one of claims 11, 12, 21, 22 or 23, further comprising display means for displaying information representing the quantity of ink in the ink reservoir.

26. An office machine comprising at least one device according to one of claims 1, 2, 11, 12 21 to 23 or 24.

27. An office machine according to claim 26, wherein the office machine constitutes a facsimile machine.

28. An office machine according to claim 26, wherein the office machine constitutes a printer.

29. A microcomputer comprising at least one device according to one of claims 1, 2, 11, 12, 21 to 23 or 24.

* * * * *

UNITED STATES PATENT AND TRADEMARK OFFICE
CERTIFICATE OF CORRECTION

PATENT NO.    : 6,310,635 B1
DATED         : October 30, 2001
INVENTOR(S)   : Pascal Coudray et al.

It is certified that error appears in the above-identified patent and that said Letters Patent is hereby corrected as shown below:

Column 3,
Line 5, "metallisation" should read -- metallization --.
Line 21, characterised" should read -- characterized --.
Line 30, "pour" should read -- for --.
Line 58, "for" should read -- fro --.

Column 4,
Line 12, "capacitor 36" should read -- capacitor 36. --.
Line 41, "metallisation" should read -- metallization --.

Column 7,
Line 36, "Sep" should read -- Step --.

Column 9,
Line 15, "claim 20," should read -- claim 21, --.

Column 10,
Line 10, "12 21 to" should read -- 12, 21 to --.

Signed and Sealed this

Ninth Day of July, 2002

Attest:

Attesting Officer

JAMES E. ROGAN
Director of the United States Patent and Trademark Office